Figure 1:
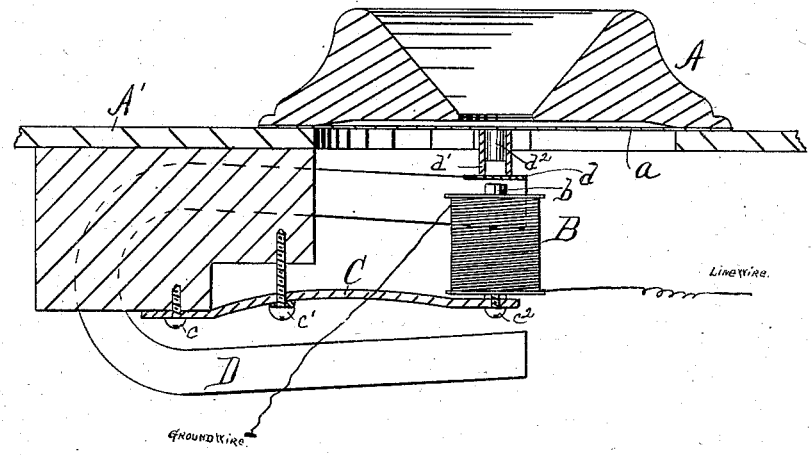

(No Model.) 3 Sheets—Sheet 1.

E. H. AMET & W. S. D. HUNT.
TELEPHONE.

No. 255,754. Patented Apr. 4, 1882.

Witnesses—
S. Everett Brown
H. W. Munday.

Inventors—
Edward H. Amet and
William S. D. Hunt
By Munday Evarts & Adcock
their Attys.

(No Model.) 3 Sheets—Sheet 2.
E. H. AMET & W. S. D. HUNT.
TELEPHONE.
No. 255,754. Patented Apr. 4, 1882.
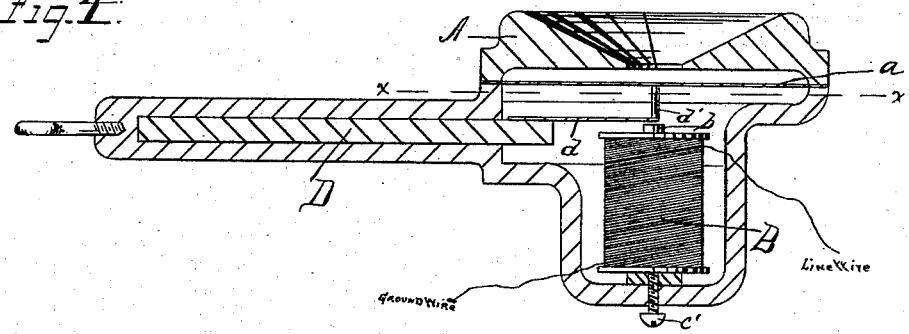
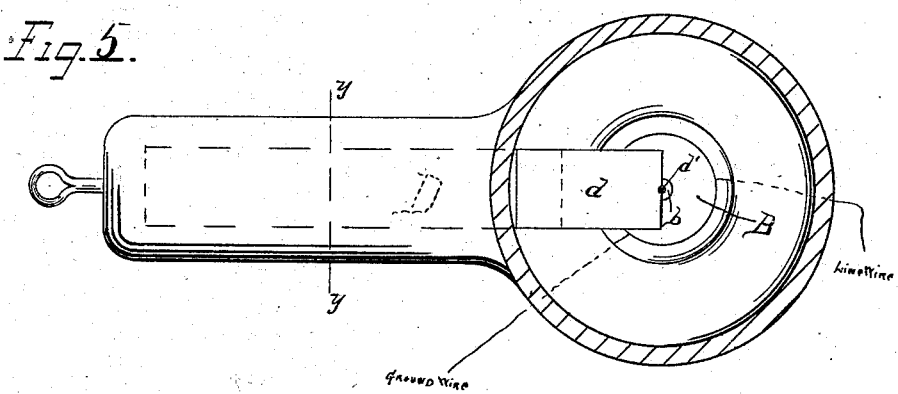
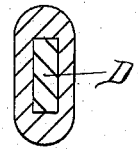
Witnesses—
T. Everett Brown
H. W. Munday.
Inventors—
Edward H. Amet and
William S. D. Hunt
By Munday Evarts & Adcock
their Attys.

(No Model.) 3 Sheets—Sheet 3.

E. H. AMET & W. S. D. HUNT.
TELEPHONE.

No. 255,754. Patented Apr. 4, 1882.

Witnesses
J. Everett Brown
H. M. Munday.

Inventors
Edward H. Amet and
William S. D. Hunt
by Munday, Evarts & Adcock
their attys.

UNITED STATES PATENT OFFICE.

EDWARD H. AMET, OF LA GRANGE, AND WILLIAM S. D. HUNT, OF IRVING PARK, ILLINOIS.

TELEPHONE.

SPECIFICATION forming part of Letters Patent No. 255,754, dated April 4, 1882.

Application filed July 19, 1881. (No model.)

*To all whom it may concern:*

Be it known that we, EDWARD H. AMET, of La Grange, Cook county, State of Illinois, and WILLIAM S. D. HUNT, of Irving Park, in said county and State, have invented certain new and useful Improvements in Telephones, of which the following is a specification.

Our invention relates to improvements in magneto-telephones.

In speaking-telephones heretofore in use the core of the helix before which the diaphragm is made to vibrate has been made magnetic, the core either consisting of a permanent magnet or being connected with one, or else being rendered magnetic by the electric current from the battery passing through the helix which surrounds the core, the object being to render the core as strongly magnetic as possible.

In magneto-telephones where no battery is employed, heretofore articulate sounds have been transmitted successfully only at a distance of a few miles, while in those where a battery is employed in connection with a battery-transmitter difficulty has been experienced in speaking at any very great distance, owing to the light battery-power that can be employed.

The object of our invention is to provide a means for transmitting and reproducing articulate sounds loud, clear, and distinct at short or long distances, as may be desired, and this without the use of a battery; and our invention consists in a simple helix surrounding a soft-iron core having no magnetic connection, and acted upon by the vibration of a thin strip of iron connected with the north or the south pole of one, two, or more magnets, said strip vibrating in unison with the transmitting or receiving diaphragm by means of a felt cushion or other connecting medium, the whole constituting a magneto-electric machine or generator, whereby the voice itself produces the electric current by which the sounds are transmitted to and reproduced by a similar or corresponding instrument at the other end of the line, there being no other current in the helix or on the line, excepting that so produced, and no other magnetism in the soft-iron core inside the former.

Both the transmitting and receiving instruments may be made alike, or the same instrument at each end of the line may be employed for both purposes; but in the transmitting-instrument we prefer to employ two or more magnets having like poles connected together by the vibrating strip of soft iron, one or more helices being arranged back of said strip; and we prefer to make the medium connecting said strip with the diaphragm of felt, soft rubber, or other like material. By attaching the poles of the two magnets to opposite ends of the soft-iron strip the force of the magnets is in a measure concentrated at the center of the strip connecting them, at which point the strip of course is most sensitive to vibration, and the effective power of the magnets is thereby materially increased.

By simply increasing the number of elements constituting the compound magnets on each side the strength or force of the electric current produced by the vibration of the soft-iron strip in front of the helix may be increased to any extent necessary to overcome the resistance and disturbing influences on the line, and to transmit and reproduce the sounds clearly and distinctly whatever may be the distance. It will be noticed from the accompanying drawings that the construction is such that any necessary number of elements may be employed. The force of the current may also be increased by employing a greater number of helices than one. If only one be employed, it should be located opposite the center of the strip.

By employing a felt, rubber, or other similar cushion as the means of communicating the voice-vibrations from the diaphragm to the soft-iron strip, secondary or reverberatory vibrations of the strip are prevented, as well as interference of other sounds with those of the voice, and the vocal sounds transmitted are softened and rendered more clear and distinct. If a piece of wood or wire is used in the transmitting-instrument in place of the felt cushion, though the sounds transmitted are very loud, the results produced are not so satisfactory, on account of the buzzing produced by interference of sounds, and the consequent lack of clearness and distinctness. In the receiving-instrument, however, but a single magnet need be employed ordinarily, and we deem it preferable to use but one; and in the receiving-instrument we employ preferably a piece of wire or other like material as the means of communicating the vibration of the soft-iron strip to the diaphragm, as no harshness or interference of sounds will be here occasioned, and by use of such hard material the full force of the vibrations of the soft-iron strip will be communicated to the diaphragm without loss, and thus reproduce the vocal sounds distinctly and with great loudness and clearness.

In the receiving-instrument, for convenience of form in handling, we prefer to use a bar-magnet instead of a horseshoe-magnet, the iron strip being connected at one end to one pole of the magnet and at the other to the piece of wire attached to the diaphragm.

Figure 2:
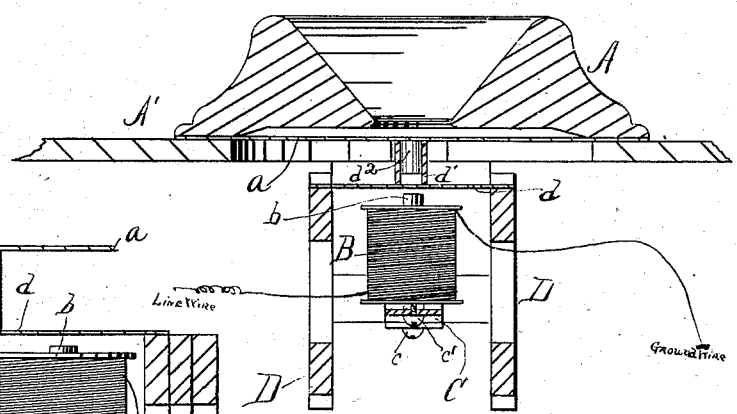
Figure 3:
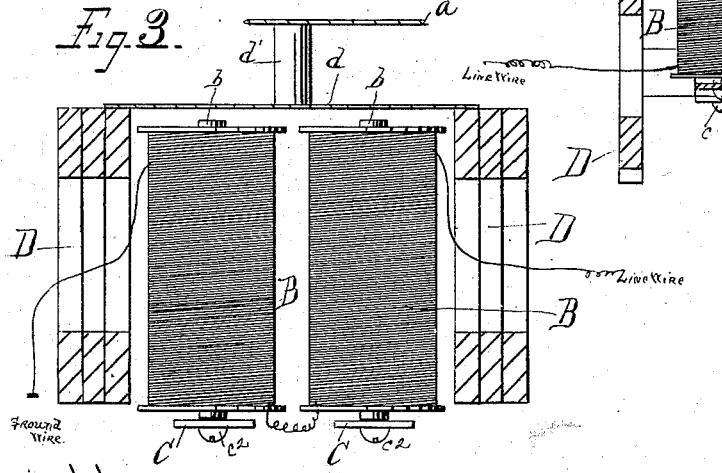
Figure 7:
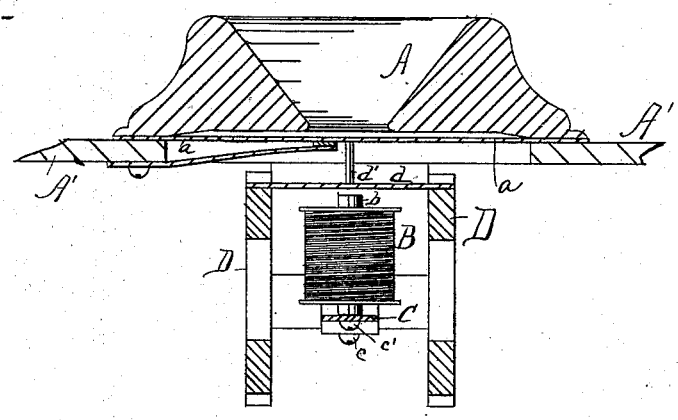

In the accompanying drawings, which form a part of this specification, and in which similar letters of reference indicate like parts, Figure 1 is a central vertical longitudinal section of a device embodying our invention; Fig. 2, a central vertical transverse section of the same; Fig. 3, a central vertical transverse section, showing a modified form in which two helices and several magnets are used. Fig. 4 is a central longitudinal section of a modified form, in which a single bar-magnet is employed. Fig. 5 is a horizontal section on line $x\ x$ of Fig. 4, and Fig. 6 is a section on line $y\ y$ of Fig. 5. Fig. 7 is a sectional view showing a modification, hereinafter described.

In said drawings, A represents the funnel or mouth-piece of the telephone, into which the person speaks, or to which the ear is applied for the purpose of hearing, if the same instrument is used for both purposes. This funnel is attached to the telephone box or frame A'. $a$ is the diaphragm, secured between the funnel A and box A'.

B is a coil surrounding a soft-iron core, $b$, supported on an adjustable arm, C, secured to the box by screw $c$ and adjusting-screw $c'$ or other suitable means. This soft-iron core has no magnetic connection with the magnets, and the arm C, to which it is attached by the screw $c^2$, should preferably be made of brass or other non-magnetic substance. The helix is connected with the line-wire, one end of course running to the ground, so as to complete the circuit with the instrument at the other end of the line, and the helix has no connection with any battery, so that the helix and line are free from any electric currents, excepting that generated in the manner about to be described.

D D are magnets, to the like poles of which—the north, for example—is connected a thin strip, $d$, made of some magnetic substance, preferably of soft iron. The magnets D are secured in any suitable manner to the telephone box or case, and so located that the strip $d$, which extends across from the pole of one magnet to the like pole of the other, comes immediately above or in front of the end of the soft-iron core $b$, before which said strip is made to vibrate in unison with the diaphragm by means of the connecting medium $d'$, one end of which is attached to the diaphragm and the other to the strip $d$, and which in the transmitting-instrument is preferably made of felt or rubber, and in the receiving-instrument of iron or other hard substance. The strip $d$ may be secured to the magnets by soldering or otherwise, and the connecting medium $d'$, if made of wire or metal, may be secured both to the diaphragm and to the strip $d$ in the same manner. When the connecting medium is made of felt or rubber, or like material it may be kept in place by gluing one end to the diaphragm, or by a short metal pin, $d^2$, soldered or otherwise secured to the diaphragm, the felt or rubber cushion being made hollow the whole or a portion of the way to admit said pin.

In the modified form shown in Fig. 3, which is specially designed to be used as a transmitting-instrument for long distances, two helices and compound magnets are shown. In the same manner indicated in said figure additional magnets may be attached to adapt the instrument for use at very long distances.

In Figs. 1, 2, and 3, the connecting medium $d'$, as shown, consists of a felt or rubber cushion. Figs. 4 and 5 represent a form specially adapted for use as a receiving-instrument, in which a single bar-magnet is employed, the soft-iron strip $d$ being attached at one end to one pole of the magnet and at the other end to the connecting medium $d'$, which in this case should be made of wire or other hard substance. If preferred, however, two magnets may be employed in the receiving-instrument and the strip $d$ made to connect the two, as in the transmitting-instrument. The voice-vibrations being communicated to the strip $d$, the vibration of the strip $d$ in front of the soft-iron core generates an electric current in the helix, which passes over the line and magnetizes and demagnetizes the soft-iron core in the corresponding instrument at the opposite end of the line, thus communicating the vibrations first to the soft-iron strip and thence to the receiving-diaphragm, by which the sounds are reproduced accurately and clearly.

If the same instrument is used both as a receiver and transmitter, the connecting medium $d'$ should be made of some substance or combination of materials having in part the properties of a cushion to somewhat soften the sounds transmitted, and which at the same time will not weaken the sound too much in the receiving-instrument. By the combination, however, of two instruments—one a transmitting-instrument provided with a felt or rubber cushion as the connecting medium $d'$, and the other a receiving-instrument provided with a wire as such connecting medium—the best results can be produced.

If preferred, some hard substance—as wood or metal—may be used in the transmitting-instrument as the connecting medium $d'$, in which case, however, we press a cushion of felt or other similar substance supported on a spring against the diaphragm, as shown in Fig. 7, for the purpose of softening the vibrations.

We have described the cores as being made of soft iron; but of course other magnetic substance could be used; however, soft iron is preferable.

We prefer to employ permanent magnets; but it is obvious that the magnets D may be electro-magnets.

The strip $d$ is best made narrow, so as to confine the magnetism more in front of the core. It may be made round or square; but it is better to make it comparatively thin, as it is thus more sensitive to the vibrations of the diaphragm.

We claim—

1. The improved telephone consisting of a diaphragm and a thin strip made of some magnetic substance connected with one or more magnets and vibrating in unison with the diaphragm in front of a helix the core of which has no magnetic connection or magnetism of its own, substantially as specified.

2. The combination, with two magnets having their like poles connected together by a thin strip of magnetic metal, of a connecting medium by which said strip is made to vibrate in unison with the diaphragm, and a helix the core of which has no magnetic connection or magnetism of its own, substantially as specified.

3. In a telephone, the combination of a helix the core of which has no magnetic connection or magnetism of its own with a vibratory magnetic strip connected to the pole of a magnet, substantially as specified.

4. The combination, with a helix having a soft-iron core, of a vibratory magnetic bar or strip connecting the like poles of two magnets, substantially as specified.

5. The combination, with the diaphragm of a telephone, of a vibratory soft-iron strip connected with like poles of two magnets, and a cushion made of felt, rubber, or other like material, placed between said diaphragm and strip, whereby said strip and diaphragm are made to vibrate in unison with each other, substantially as specified.

EDWARD H. AMET.
WILLIAM S. D. HUNT.

Witnesses:
H. M. MUNDAY,
JOHN W. MUNDAY.